US008829085B2

(12) United States Patent
Markgraf et al.

(10) Patent No.: US 8,829,085 B2
(45) Date of Patent: Sep. 9, 2014

(54) GLASS FIBER-REINFORCED POLYOXYMETHYLENE

(75) Inventors: Kirsten Markgraf, Weinheim (DE); Lowell Larson, Independence, KY (US)

(73) Assignee: Ticona GmbH, Kelsterbach (DE)

( * ) Notice: Subject to any disclaimer, the term of this patent is extended or adjusted under 35 U.S.C. 154(b) by 176 days.

(21) Appl. No.: 13/273,475

(22) Filed: Oct. 14, 2011

(65) Prior Publication Data

US 2012/0157588 A1    Jun. 21, 2012

(30) Foreign Application Priority Data

Oct. 14, 2010  (EP) .................................... 10187617

(51) Int. Cl.
| C08K 3/40 | (2006.01) |
| C08K 5/3432 | (2006.01) |
| C08K 5/3445 | (2006.01) |
| C08K 5/3492 | (2006.01) |
| C08K 5/29 | (2006.01) |
| C08K 5/31 | (2006.01) |
| C08L 75/10 | (2006.01) |
| C08G 18/28 | (2006.01) |

(52) U.S. Cl.
USPC ............. 524/99; 524/100; 524/106; 524/195; 524/494; 524/590

(58) Field of Classification Search
USPC ........... 524/100, 196, 197, 512, 593, 99, 106, 524/195, 494, 590
See application file for complete search history.

(56) References Cited

U.S. PATENT DOCUMENTS

| 3,574,786 | A |   | 4/1971 | Ishida et al. |
| 4,493,751 | A |   | 1/1985 | Cherdron et al. |
| 4,652,594 | A |   | 3/1987 | Auerbach et al. |
| 4,828,755 | A | * | 5/1989 | Kusumgar et al. ............ 252/511 |
| 5,326,846 | A |   | 7/1994 | Nagai |
| 5,530,061 | A |   | 6/1996 | Sanada |
| 6,077,908 | A | * | 6/2000 | Yahiro ........................ 525/218 |
| 2005/0107513 | A1 | * | 5/2005 | Papke ......................... 524/494 |
| 2007/0066746 | A1 | * | 3/2007 | Gunnewig et al. ........... 524/500 |

FOREIGN PATENT DOCUMENTS

| CN | 101759955 | 6/2010 |
| DE | 21 62 345 | 7/1972 |
| DE | 2947490 | 6/1981 |
| EP | 1 630 198 | 3/2006 |
| GB | 1331829 | 9/1973 |
| JP | 55-145529 | 11/1980 |
| JP | 56-105905 | 8/1981 |
| JP | 3284675 | 12/1991 |
| JP | 6179671 | 6/1994 |
| JP | 7010871 | 1/1995 |
| JP | 7033766 | 2/1995 |
| JP | 11 181232 | 7/1999 |
| JP | 11181231 | 7/1999 |
| JP | 2000-154181 | 6/2000 |
| JP | 2000336241 | 12/2000 |
| JP | 4741120 | 6/2002 |
| JP | 2009286874 | 12/2009 |
| JP | 2010037445 | 2/2010 |
| WO | WO 2006/105918 | 10/2006 |
| WO | WO 2010/035351 | 4/2010 |
| WO | WO 2010073529 | 7/2010 |

OTHER PUBLICATIONS

Extended European Search Report of EP 10187617.5 dated Apr. 13, 2011.
Extended European Search Report of EP 11185172.1 dated Dec. 8, 2011.
Article—*Tensile Behavior of Glass-Fiber-Filled Polyacetal: Influence of the Functional Groups of Polymer Matrices*, K. Kawaguchi, E. Masuda, Y. Tajima, Journal of Applied Polymer Science, vol. 107, No. 1, Jan. 5, 2008, pp. 667-673.

* cited by examiner

*Primary Examiner* — Kriellion Sanders
(74) *Attorney, Agent, or Firm* — Dority & Manning, P.A.

(57) ABSTRACT

The present invention relates to a molding composition, a process for the manufacturing of said molding composition, molded parts obtainable therefrom as well as the use of the molding composition for the manufacturing of molded parts used in the automotive industry, for housings, latches, window winding systems, wiper systems, sun roof systems, seat adjustments, levers, gears, claws, pivot housing or wiper arms.

15 Claims, 1 Drawing Sheet ated with aminoalkylsilane compounds. The diisocyanate coupling agent is used to improve the compatibility of the polyoxymethylene matrix with the reinforcing fibers.
GLASS FIBER-REINFORCED POLYOXYMETHYLENE The present invention relates to a molding composition, a process for the manufacturing of said molding composition, molded parts obtainable therefrom as well as the use of the molding composition for the manufacturing of molded parts used in the automotive industry, for housings, latches, window winding systems, wiper systems, sun roof systems, seat adjustments, levers, gears, claws, pivot housing or wiper arms.

The superior mechanical properties of polyoxymethylene (POM) molding compositions are the reason for their use in numerous applications. To improve their properties, the polyoxymethylene homo- and -copolymers are provided with additives to adapt the properties to the application, for example by using reinforcing fibers.

The effect of these additives on the properties of the molding composition is affected by the coupling of the additive to the plastics matrix. Attempts to couple glass fibers to a polyoxymethylene matrix are known in the prior art.

DE 2162345 discloses a thermoplastic composition comprising a polyoxymethylene, an isocyanate coupling agent and reinforcing glass fibers wherein the glass fibers are sized with aminoalkylsilane compounds. The diisocyanate coupling agent is used to improve the compatibility of the polyoxymethylene matrix with the reinforcing fibers.

Isocyanate coupling agents are highly reactive with nucleophilic groups such as OH or $NH_2$ groups. Therefore, the use of further additives to reinforce polyoxymethylene compositions which comprise coupling agents on basis of isocyanates are limited.

US 2005/0107513 tries to avoid these problems and uses a catalyst which catalyses the chemical reaction between the polyacetal matrix polymer and the surface of the additive, i.e. the glass fiber. Thus, the use of a coupling agent is avoided. However, coupling agents such as isocyanates are very effective and contribute to the mechanical properties of the fiber reinforced polyoxymethylene compositions. On the other hand, sensitive additives which can react with the coupling agents were believed to be avoided. Consequently, additives which reduce the formaldehyde emission have not been used in the prior art for fiber reinforced polyoxymethylene molding compositions due to the presence of highly reactive isocyanate coupling agents.

U.S. Pat. No. 4,652,594 discloses a glass fiber-reinforced oxymethylene polymer molding composition comprising a blend of:
(a) a major portion of an oxymethylene polymer,
(b) glass fibers in a reinforcing amount,
(c) as a coupling agent for said glass fibers and said oxymethylene polymer, a minor but effective amount of at least one prepolymeric amino resin selected from condensation products of formaldehyde with at least one of guanidine, melamine, urea, guanamine or a substituted guanamine and having a degree of polymerization in the range of from about 2 to about 5, and
(d) an amount of an acid catalyst effective to promote the cross-linking reactions of said amino resin.

JP 11181232 discloses a fiber-reinforced conductive polyacetal resin composition comprising 5 to 20 wt.-% of conductive carbon as a processing auxiliary.

Figure 1:
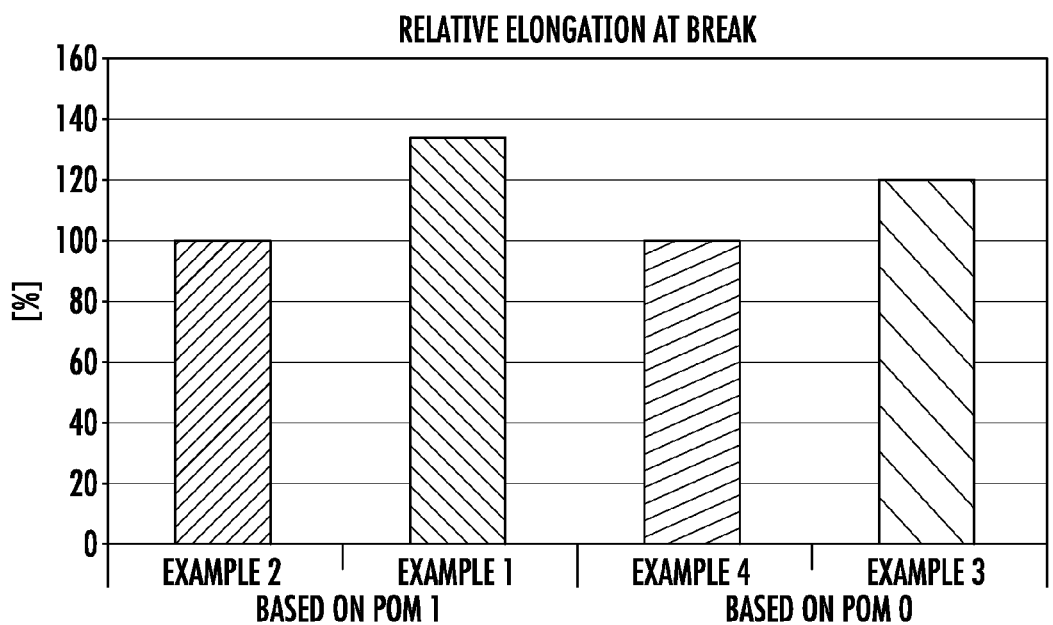
FIG. 1 is a bar graph showing the relative elongation at break for the examples described below.

The object of the present invention is the provision of a fiber reinforced polyoxymethylene composition which demonstrates improved mechanical properties while having low formaldehyde emissions.

It has surprisingly been found that fiber reinforced compositions which comprise at least one polyoxymethylene, at least one coupling agent, at least one reinforcing fiber and at least one formaldehyde scavenger lead to a molding composition which has excellent mechanical properties and low formaldehyde emissions which are required for many applications especially in the automotive industry and because of environmental aspects.

An embodiment of the present invention is a molding composition comprising
a) at least one polyoxymethylene (A),
b) at least one coupling agent (B), which is polyisocyanate
c) at least one reinforcing fiber (C),
d) at least one formaldehyde scavenger (D) and
e) 0.1 to 3 wt.-% of stabilizer and processing auxiliaries, wherein the weight is based on the total weight of the composition.

Component (A)

The molding composition according to the present invention comprises at least one polyoxymethylene (A) (hereinafter also referred to as "component (A)"). Component (A) of the molding composition according to the invention is a polyoxymethylene homo- or -copolymer. Preferably, the polyoxymethylene (A) has a high content of terminal hydroxyl groups and more preferably contains no low molecular weight constituents or only a small proportion thereof. Polyoxymethylene (A) preferably has terminal hydroxyl groups, for example hydroxyethylene groups ($—OCH_2CH_2—OH$) and hemi-acetal groups ($—OCH_2—OH$). According to a preferred embodiment, at least 25%, preferably at least 50%, more preferably at least 75% of the terminal groups of the polyoxymethylene (A) are hydroxyl groups, especially hydroxyethylene groups.

The content of hydroxyl groups end groups is especially preferred at least 80%, based on all terminal groups. Within the meaning of the present invention, the term "all terminal groups" is to be understood as meaning all terminal and—if present—all side terminal groups.

In addition to the terminal hydroxyl groups, the POM may also have other terminal groups usual for these polymers. Examples of these are alkoxy groups, formate groups, acetate groups or aldehyde groups. According to a preferred embodiment of the present invention the polyoxymethylene (A) is a homo- or copolymer which comprises at least 50 mol-%, preferably at least 75 mol-%, more preferably at least 90 mol-% and most preferably at least 95 mol-% of $—CH_2O—$ repeat units.

It has been found that molding compositions which demonstrate an extremely high impact resistance can be obtained with a polyoxymethylene (A) which has low molecular weight constituents having molecular weights below 10,000 Dalton of less than 15% by weight, preferably less than 10% by weight, more preferably less than 7% by weight and most preferably less than 5% by weight, based on the total mass of the polyoxymethylene.

The "POM polymers" which can be used as polyoxymethylene (A) generally have a melt volume rate MVR of less than 50 $cm^3$/10 min, preferably ranging from 1 to 50 $cm^3$/10 min, further preferably ranging from 1 to 20 $cm^3$/10 min, more preferably ranging from 2 to 15 $cm^3$/10 min and especially ranging from 4 to 13 cm³/10 min, determined according to ISO 1133 at 190° C. and 2.16 kg.

Preferably, polyoxymethylene (A) has a content of terminal hydroxyl groups of at least 5 mmol/kg, preferably at least 10 mmol/kg, more preferably at least 15 mmol/kg and most preferably ranging from 15 to 50 mmol/kg, especially from 18 to 40 mmol/kg, more especially 20 to 30 mmol/kg.

The content of terminal hydroxyl groups can be determined as described in K. Kawaguchi, E. Masuda, Y. Tajima, Journal of Applied Polymer Science, Vol. 107, 667-673 (2008).

The preparation of the polyoxymethylene (A) can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in particular in the melt. Initiators which may be used are the compounds known per se, such as trifluoromethane sulfonic acid, these preferably being added as solution in ethylene glycol to the monomer. The procedure and termination of the polymerization and working-up of the product obtained can be effected according to processes known per se. By a suitable choice of the polymerization parameters, such as duration of polymerization or amount of molecular weight regulator, the molecular weight and hence the MVR value of the resulting polymer can be adjusted. The criteria for choice in this respect are known to the person skilled in the art. The above-described procedure for the polymerization leads as a rule to polymers having comparatively small proportions of low molecular weight constituents. If a further reduction in the content of low molecular weight constituents were to be desired or required, this can be effected by separating off the low molecular weight fractions of the polymer after the deactivation and the degradation of the unstable fractions after treatment with a basic protic solvent.

This may be a fractional precipitation from a solution of the stabilized polymer, polymer fractions of different molecular weight distribution being obtained.

Preference is also given to polyoxymethylene (A) which also is obtainable by polymerizing polyoxymethylene forming monomers in the presence of heteropoly acids.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than 2% by weight.

The heteropoly acid is a generic term for polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

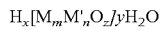

wherein
M represents an element selected from the group consisting of P, Si, Ge, Sn, As, Sb, U, Mn, Re, Cu, Ni, Ti, Co, Fe, Cr, Th and Ce, M' represents an element selected from the group consisting of W, Mo, V and Nb,
m is 1 to 10,
n is 6 to 40,
z is 10 to 100,
x is an integer of 1 or above, and
y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

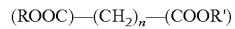

Wherein
n is an integer from 2 to 12, preferably 3 to 6 and
R and R' represent independently from each other an alkyl group having 1 to 4 carbon atoms, preferably selected from the group consisting of methyl, ethyl, n-propyl, isopropyl, n-butyl, iso-butyl and tert.-butyl.

In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

wherein
m is an integer from 0 to 10, preferably from 2 to 4 and
R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are selected from the group consisting of dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

Further, polyoxymethylene (A) can also be a conventional oxymethylene homopolmyer and/or oxymethylene copolymer. As component (A) polyoxymethylenes are described for example in DE-A-2947490 which are generally unbranched linear polymers which contain as a rule at least 80%, preferably at least 90%, oxymethylene units (—$CH_2$—O—). As mentioned before, the term polyoxymethylenes comprises both, homopolymers of formaldehyde or its cyclic oligomers, such as trioxane or 1,3,5,7-tetraoxacyclooctane, and corresponding copolymers. For example the following components can be used in the polymerization process: ethyleneoxide, 1,2-propyleneoxide, 1,2-butyleneoxide, 1,3-butyleneoxide, 1,3-dioxane, 1,3-dioxolane, 1,3-dioxepane and 1,3,6-trioxocane as cyclic ethers as well as linear oligo- or polyformales, like polydioxolane or polydioxepane.

Further, functionalized polyoxymethylenes which are prepared by copolymerization of trioxane and the formal of trimethylolpropane (ester), of trioxane and the alpha, alpha and the alpha, beta-isomers of glyceryl formal (ester) or of trioxane and the formal of 1,2,6-hexantriol (ester) can be used as polyoxymethylene (A).

Such POM homo- or copolymers are known per se to the person skilled in the art and are described in the literature.

The molding composition of the present invention preferably comprises polyoxymethylene (A) in an amount of up to 95 weight-%, preferably ranging from 40 to 90 weight-%, more preferably ranging from 55 to 85 weight-%, wherein the weight is based on the total weight of the molding composition.

Component (B)

As a further component, the molding composition of the present invention comprises at least one coupling agent (B) which is a polyisocanate.

The coupling agent provides a linkage between the polyoxymethylene (A) and the reinforcing fiber and/or the sizing material which is coated on the reinforcing fiber (C).

Preferred are polyfunctional coupling agents, such as trifunctional or bifunctional agents.

The coupling agent improves the compatibility of the reinforcing fibers (C) with the polymer matrix. A suitable coupling agent (B) is a polyisocyanate, preferably organic diisocyanate, more preferably a polyisocyanate selected from the group consisting of aliphatic diisocyanates, cycloaliphatic diisocyanates, aromatic diisocyanates and mixtures thereof.

Preferably, the polyisocyanate is a diisocyanate or a triisocyanate which is more preferably selected from 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexa methylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis (isocyanatomethyl)-cyclohexane diisocyanate; 4,4'-bis (isocyanatomethyl)dicyclohexane; 2,4'-bis (isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methyl hexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4, 4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

Especially preferred are aromatic polyisocyanates, such as 4,4'-diphenylmethane diisocyanate (MDI).

The molding composition of the present invention comprises the coupling agent (B) preferably in an amount ranging from 0.1 to 5 weight-%, more preferably ranging from 0.2 to 3 weight-% and most preferably ranging from 0.3 to 1.5 weight-%, wherein the weight is based on the total weight of the composition.

Component (C)

A further component of the composition of the present invention is at least one reinforcing fiber (C).

Reinforcing fibers of which use may advantageously be made are mineral fibers, such as glass fibers, polymer fibers, in particular organic high-modulus fibers, such as aramid fibers, or metal fibers, such as steel fibers, or carbon fibers or natural fibers, fibers from renewable resources.

These fibers may be in modified or unmodified form, e.g. provided with a sizing, or chemically treated, in order to improve adhesion to the plastic. Glass fibers are particularly preferred.

Glass fibers are provided with a sizing to protect the glass-fiber, to smooth the fiber but also to improve the adhesion between the fiber and the matrix material. A sizing usually comprises silanes, film forming agents, lubricants, wetting agents, adhesives, optionally antistatic agents and plasticizers, emulsifiers and optionally further additives.

Specific examples of silanes are aminosilanes, e.g. 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino) propyltrimethoxysilane, N-[3-(trimethoxysilyl)propyl]-1,2-ethane-diamine.

Film forming agents are for example polyvinylacetates, polyesters and polyurethanes. Sizings based on polyurethanes may be used advantageously.

The reinforcing fibers may be compounded into the polyoxymethylene matrix, for example in an extruder or kneader. However, the reinforcing fibers may also advantageously take the form of continuous-filament fibers sheathed or impregnated with the polyoxymethylene molding composition in a process suitable for this purpose, and then processed or wound up in the form of a continuous strand, or cut to a desired pellet length so that the fiber lengths and pellet lengths are identical. An example of a process particularly suitable for this purpose is the pultrusion process.

According to the invention, the long-fiber-reinforced polyoxymethylene molding composition may be a glass-fiber bundle which has been sheathed with one or more layers of the polyoxymethylene matrix polymer in such a way that the fibers have not been impregnated and mixing of the fibers and the polyacetal matrix polymer does not take place until processing occurs, for example injection molding. However, the fibers have advantageously been impregnated with the polyacetal matrix polymer.

According to a preferred embodiment, the molding composition of the present invention comprises at least one reinforcing fiber which is a mineral fiber, preferably a glass fiber, more preferably a coated or impregnated glass fiber. Glassfibers which are suitable for the molding composition of the present invention are commercially available, e.g. Johns Manville, ThermoFlow® Chopped Strand 753, OCV Chopped Strand 408 A, Nippon Electric Glass Co. (NEG) Chopped Strand T-651.

The reinforcing fibers are preferably present in the molding composition of the present invention in an amount ranging from 5 to 50 wt.-%, preferably 7 to 45 wt.-% and especially preferably from 10 to 40 wt.-%, wherein the weight is based on the total weight of the composition.

Component (D)

A further component of the molding composition of the present invention is a formaldehyde scavenger (D). Formaldehyde scavengers are additives for scavenging formaldehyde. Suitable formaldehyde scavengers are nitrogen-containing stabilizers. Mainly, these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyane diamide, urea and its derivatives and also pyrrolidone and compounds derived therefrom. Examples of suitable pyrrolidones are imidazolidinone and compounds derived therefrom, such as hydantoines, derivatives of which are particularly advantageous, and those particularly advantageous among these compounds are allantoin and its derivatives. Other particularly advantageous compounds are triamino-1,3,5-triazine (melamine) and its derivatives, such as melamine-formaldehyde condensates and methylol melamine. Very particular preference is given to melamine, methylol melamine, melamine-formaldehyde condensates, and allantoin. Oligomeric polyamides are also suitable in principle for use as formaldehyde scavengers. The formaldehyde scavenger may be used individually or in combination.

Further, the aldehyde scavenger (D) can be a guanidine compound which can include an aliphatic guanamine-based compound, an alicyclic guanamine-based compound, an aromatic guanamine-based compound, a hetero atom-containing guanamine-based compound, or the like.

Examples of the aliphatic guanamine-based compounds include monoguanamines such as acetoguanamine, valeroguanamine, caproguanamine, heptanoguanamine, capryloguanamine or stearoguanamine; alkylene bisguanamines such as succinoguanamine, glutaroguanamine, adipoguanamine, pimeloguanamine, suberoguanamine, azeloguanamine or sebacoguanamine. Examples of the alicyclic guanamine-based compounds include monoguanamines such as cyclohexanecarboguanamine, norbornene carboguanamine, cyclohexenecarboguanamine or norbornane carboguanamine; and derivatives thereof in which the cycloalkane residue is substituted with 1 to 3 functional groups such as alkyl group, hydroxy group, amino group, acetoamino group, nitrile group, carboxy group, alkoxycarbonyl group, carbamoyl group, alkoxy group, phenyl group, cumyl group or hydroxyphenyl group.

Examples of the aromatic guanamine-based compounds are monoguanamines such as benzoguanamine and derivatives thereof in which the phenyl residue is substituted with 1 to 5 functional groups such as alkyl group, hydroxy group, amino group, acetoamino group, nitrile group, carboxy group, alkoxy carbonyl group, carbamoyl group, alkoxy group, phenyl group, cumyl group or hydroxyphenyl group, (for example, toluguanamine, xyloguanamine, phenylbenzoguanamine, hydroxybenzoguanamine, 4-(4'-hydroxyphenyl)benzoguanamine, nitrilebenzoguanamine, 3,5-dimethyl-4-hydroxybenzoguanamine, 3,5-di-t-butyl-4-hydroxybenzoguanamine, and the like), naphthoguanamine and derivatives thereof in which the naphthyl residue is substituted with the above functional group; polyguanamines such as phthaloguanamine, isophthaloguanamine, terephthaloguanamine, naphthalene diguanamine or biphenylene diguanamine; aralkyl- or aralkylene-guanamines such as phenylacetoguanamine, [beta]-phenylpropioguanamine or xylylene bisguanamine.

Examples of the heteroatom-containing guanamine-based compound include acetal group-containing guanamines such as 2,4-diamino-6-(3,3-dimethoxypropyl-s-triazine; dioxane ring-containing guanamines such as [2-(4',6'-diamino-s-triazin-2'-yl)ethyl]-1,3-dioxane or [2-(4',6'-diamino-s-triazin-2'-yl)ethyl]-4-ethyl-4-hydroxymethyl-1,3-dioxane; tetraoxospiro ring-containing guanamines such as CTU-guanamine or CMTU-guanamine; isocyanuric ring-containing guanamines such as 1,3,5-tris(2-(4',6'-diamino-s-triazin-2'-yl) ethyl)isocyanurate or 1,3,5-tris[3-(4',6'-diamino-s-triazin-2'-yl)propyl]-isocyanurate); imidazoyl ring-containing guanamines such as guanamine compounds described in JP-A 6-179671 and JP-A 7-10871; imidazole ring-containing guanamines such as guanamine compounds described in JP-A 47-41120, JP-A 3-284675 and JP-A 7-33766; and guanamine compounds described in JP-A 2000-154181, and the like.

Furthermore, the guanamine-based compound includes a compound in which the hydrogen atom of the amino group of the aforementioned guanamine-based compound is substituted with an alkoxymethyl group such as mono- to tetra-methoxymethylbenzoguanamine, mono- to octa-methoxymethyl-CTU-guanamine, or the like.

Among these guanamine-based compounds, particularly preferable are guanamine, acetoguanamine, benzoguanamine, and CTU-guanamine.

Further formaldehyde scavengers (D) which are linked to oligomers or polymers are also suitable. Examples of these groups of formaldehyde scavengers are shown in formula I.

$$R^1-[X-CO-NH-R^3-NH-CO-NR^2-R^4]_o \quad (I),$$

wherein $R^1$ is a moiety comprising 2 to 20 carbon atoms, preferably an aliphatic or aromatic rest, more preferably the aliphatic or aromatic rest of a polyhydroxy or a polyamino compound having at least 2, preferably 2 to 6 hydroxy and/or amino groups, X is —O— or —NR²—

$R^2$ is H, alkyl, cycloalkyl, aryl or aralkyl, $R^3$ is alkylene, cycloalkylene, arylene or aralkylene, $R^4$ is a moiety selected from the formula II, III, IV, V, VI and VII

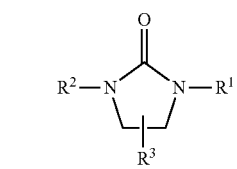

(II)

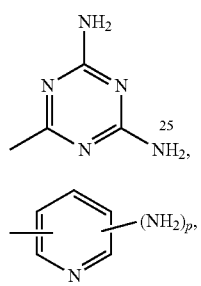

(III)

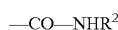

—CO—NHR² (IV), (V)

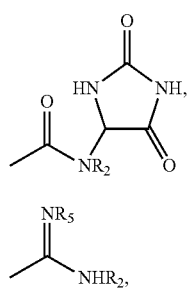

(VI)

—HN—C(=NH)—NH—CN (VII), wherein $R^5$ is H, —CO—CH₃ or —CO—C₆H₅, o is an integer ranging from 2 to 6 and p is 1 or 2.

Additionally, suitable formaldehyde scavengers (D) are imidazolidine-2-one compounds. Preference is given to imidazolidine-2-one compounds of the following formula:

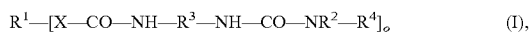

wherein $R^1$ and $R^2$ are independently from each other H, $C_1$-$C_{20}$-alkyl, OR4, —NO₂, hydroxyalkyl having 1 to 10 carbon atoms, $R^3$ is H, $C_1$-$C_{20}$ alkyl which is optionally substituted, keto group, aldehyde group, —COOR4, amine or amide group, or an aromatic ring having 5 to 10 carbon atoms, $R^4$ is a $C_1$-$C_4$-alkyl.

Especially preferred imidazolidine-2-one compounds are:

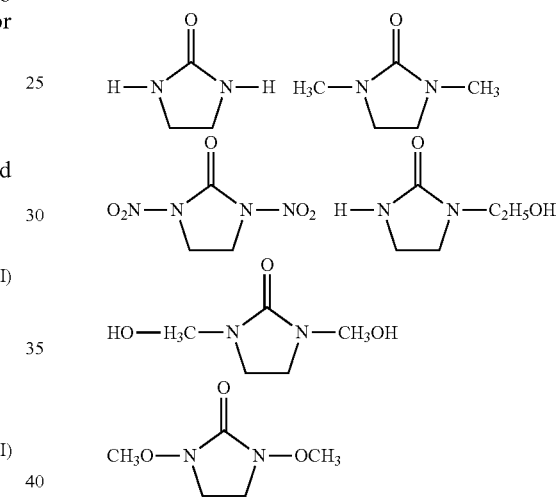

It has been surprisingly found that aromatic formaldehyde scavengers (D) are very suitable for the molding compositions of the present invention.

According to a preferred embodiment of the present invention, the formaldehyde scavenger (D) has a melting point higher than 235° C., preferably higher than 250° C., more preferably higher than 280° C., most preferably higher than 300° C. and especially higher than 320° C. Further, it has been found that the pKa value of the formaldehyde scavenger (D) may influence the formaldehyde emission. According to a preferred embodiment, the formaldehyde scavenger (D) has a pKa value ranging from 4.5 to 10, preferably from 4.5 to 6.5.

Further, preference is given to a formaldehyde scavenger (D) which has at least one triazine moiety. The use of formaldehyde scavengers which comprise at least one triazine moiety does not only have excellent formaldehyde reducing properties but also positively influences the mechanical properties of the molding composition. Preferred formaldehyde scavengers (D) which comprise a triazine moiety are selected from the group consisting of guanamine, melamine, N-butylmelamine, N-phenylmelamine, N,N-diphenylmelamine, N,N-diallylmelamine, N,N',N"-triphenylmelamine, benzoguanamine, acetoguanamine, 2,4-diamino-6-butyl-sym-triazine, ammeline, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, 1,1-bis(3,5-diamino-2,4,6-triazinyl)methane, 1,2-bis(3,5-diamino-2,4,6-triazinyl)ethyne (other name: succinoguanamine), 1,3-bis(3, 5-diamino-2,4,6-triazinyl)propane, 1,4-bis(3,5-diamino-2,4, 6-triazinyl)butane, methylenated melamine, ethylenedimelamine, triguanamine, melamine cyanurate, ethylene dimelamine cyanurate and triguanamine cyanurate.

These triazine derivatives may be used singly or in combinations of two or more compounds. Guanamines and melamine are preferred, and melamine is particularly preferable.

Preferred formaldehyde scavengers (D) are hydrazides, more preferably dihydrazides such as sebacic dihydrazide (SDH).

Examples of the hydrazide compound which can be used in the present invention as formaldehyde scavenger (D) include an aliphatic carboxylic acid hydrazide-based compound, an alicyclic carboxylic acid hydrazide-based compound, an aromatic carboxylic acid hydrazide-based compound, heteroatom-containing carboxylic acid hydrazide-based compound, a polymer-type carboxylic acid hydrazide-based compound, and the like. These carboxylic acid hydrazides can be used alone or in combination of two or more of them. Examples of the aliphatic carboxylic acid hydrazide-based compound include: monocarboxylic acid hydrazide (lauric acid hydrazide, stearic acid hydrazide, 12-hydroxystearic acid hydrazide 1,2,3,4-butane tetracarboxylic acid hydrazide or the like); polycarboxylatic acid hydrazide such as succinic acid mono- or di-hydrazide, glutaric acid mono- or di-hydrazide, adipic acid mono- or di-hydrazide, pimelic acid mono- or di-hydrazide, suberic acid mono- or di-hydrazide, azelaic acid mono- or di-hydrazide, sebacic acid mono- or di-hydrazide, dodecanedioic acid mono- or di-hydrazide, hexadecane dioic acid mono- or di-hydrazide, eicosandioic acid mono- or di-hydrazide, 7,11-octadecadiene-1,18-dicarbohydrazide, and the like. Examples of the alicyclic carboxylic acid hydrazide-based compound include: monocarboxylic acid hydrazides such as cyclohexane carboxylic acid hydrazide; and polycarboxylic acid hydrazides such as dimer acid mono- or di-hydrazide, trimer acid mono- to tri-hydrazide, 1,2-, 1,3-, or 1,4-cyclohexane dicarboxylic acid mono- or di-hydrazide, cyclohexane tricarboxylic acid mono- to tri-hydrazide, and the like. Examples of the aromatic carboxylic acid hydrazide include: mono-carboxylic acid hydrazides (benzoic acid hydrazide and functional group substitution products thereof, such as derivatives where functional groups such as alkyl group, hydroxy group, acetoxy group, amino group, acetoamino group, nitrile group, carboxy group, alkoxycarbonyl group, carbamoyl group, alkoxy group, phenyl group, benzyl group, cumyl group, or hydroxyphenyl group are substituted by 1 to 5 phenyl residues of benzoguanamine (for example, o-toluic acid hydrazide, m-toluic acid hydrazide, p-toluic acid hydrazide, 2,4-, 3,4-, 3,5- or 2,5-dimethyl-benzoic acid hydrazide, o-, m- or p-hydroxy-benzoic acid hydrazide, o-, m- or p-acetoxy-benzoic acid hydrazide, 4-hydroxy-3-phenyl-benzoic acid hydrazide, 4-acetoxy-3-phenyl-benzoic acid hydrazide, 4-pheny-benzoic acid hydrazide, 4-(4'-phenyl)benzoic acid hydrazide, 4-hydroxy-3,5-dimethyl-benzoic acid hydrazide, 4-hydroxy-3,5-di-t-butyl-benzoic acid hydrazide, 4-hydroxy-3,5-di-t-butylphenyl-benzoic acid hydrazide, and 4-hydroxy-3,5-di-t-butylphenyl-propionic acid hydrazide); [alpha]- or [beta]-naphthoic acid hydrazide and functional substitution products thereof, such as 1-naphthoic acid hydrazide, 2-naphthoic acid hydrazide, 3-hydroxy-2-naphthoic acid hydrazide, or 6-hydroxy-2-naphthoic acid hydrazide; and polycarboxylic acid hydrazides such as isophthalic acid mono- or di-hydrazide, terephthalic acid mono- or di-hydrazide, 1,4- or 2,6-naphthalene dicarboxylic acid mono- or di-hydrazide, 3,3'-, 3,4'- or 4,4'-diphenyldicarboxylic acid mono- or di-hydrazide, diphenylether dicarboxylic acid mono- or di-hydrazide, diphenylmethane dicarboxylic acid mono- or di-hydrazide, diphenylethane dicarboxylic acid mono- or di-hydrazide, diphenoxyethane dicarboxylic acid mono- or di-hydrazide, diphenylsulphone dicarboxylic acid mono- or di-hydrazide, diphenylketone dicarboxylic acid mono- or di-hydrazide, 4,4'''-terphenyl dicarboxylic acid mono- or di-hydrazide, 4,4''''-quaterphenyldicarboxylic acid mono- or di-hydrazide, 1,2,4-benzene tricarboxylic acid mono- to tri-hydrazide, pyromellitic acid mono- to tetra-hydrazide, and 1,4,5,8-naphthoic acid mono- to tetra-hydrazide).

Examples of the heteroatom-containing carboxylic acid hydrazide-based compound include: mono- or di-hydrazide of dioxane ring-containing carboxylic acid hydrazides such as 5-methylol-5-ethyl-2-(1,1-dimethyl-2-carboxyethyl)-1,3-dioxane; tetraoxo spiro ring-containing carboxylic acid hydrazides such as mono- or di-hydrazide of 3,9-bis(2-carboxyethyl)-2,4,8,10-tetraoxospiro[5,5]undecane, mono- or di-hydrazide of 3,9-bis(2-methoxycarbonylethyl)-2,4,8,10-tetraoxospiro[5,5]undecane, mono- or di-hydrazide of 3,9-bis(1,1-dimethyl-1-carboxymethyl)-2,4,8,10-tetraoxospiro[5,5]undecane, or mono- or di-hydrazide of 3,9-bis(1,1-dimethyl-1-methoxycarbonylmethyl)-2,4,8,10-tetraoxospiro[5,5]undecane; isocyanuric ring-containing carboxylic acid hydrazides such as mono- to tri-hydrazide of 1,3,5-tris[2-carboxyethyl]isocyanulate, or mono- to tri-hydrazide of 1,3, 5-tris(3-carboxypropyl)isocyanurate; and hydantoin ring-containing carboxylic acid hydrazides such as 1,3-bis(2-hydrazinocarbonylethyl)-5-isopropyl hydantoin, The polymer-type carboxylic acid hydrazide-based compounds are exemplified as follows: single polymers or copolymers of poly(meth)acrylic acid hydrazides which may be crosslinked compounds, such as olefin copolymer, vinyl monomer copolymer, styrene copolymer of divinylbenzene crosslinked compound, or bis(meth)acrylic ester crosslinked compound; polymer described in JP-A 55-145529 and JP-A 56-105905; commercially available "amino polyacrylic amide APA" Otsuka Chemical Co., Ltd.; and copolymer described in U.S. Pat. No. 3,574,786.

Further, dicyandiamide (DCD) can be used as component (D).

Further, zeolites can be used as component (D).

According to a preferred embodiment of the present invention, the formaldehyde scavenger (D) has at least one —NH$_2$, preferably at least two —NH$_2$ groups, most preferably at least three —NH$_2$ groups.

It has surprisingly been found that an excellent performance can be achieved with a formaldehyde scavenger (D) which has a melting point which is at least 10° C., preferably at least 20° C., more preferably at least 30° C., even more preferably at least 50° C. higher than the melting point of the polyoxymethylene (A).

Especially preferred as a formaldehyde scavenger (D) is melamine.

The formaldehyde scavenger (D) is preferably present in the composition in an amount of up to 2 weight-%, more preferably in an amount ranging from 0.001 to 1.5 wt.-%, further more preferably ranging from 0.01 to 1.0 wt.-%, most preferably ranging from 0.05 to 0.5 wt.-% and especially ranging from 0.08 to 0.3 weight-%, wherein the weight is based on the total weight of the composition.

The molding materials or moldings according to the invention can optionally be stabilized and/or modified by known additives. Such stabilizers and processing auxiliaries used as optional component (E) are known to the person skilled in the art.

Component (E) is present in an amount from 0.1 to 3 wt.-%.

The stabilizers are, for example, antioxidants, acid scavengers, UV stabilizers or heat stabilizers. In addition, the molding material or the molding may contain processing auxiliaries, for example adhesion promoters, lubricants, nucleating agents, demolding agents, fillers, or antistatic agents and additives which impart a desired property to the molding material or to the molding, such as dyes and/or pigments and/or impact modifiers and/or tribological additives and/or glass beads and/or additives imparting electrical conductivity; and mixtures of these additives, but without limiting the scope to said examples.

In a preferred embodiment the molding composition comprises an ultrahigh molecular weight polyethylene. Ultrahigh-molecular-weight polyethylene (UHMW-PE) can be employed for example as a powder, in particular as a micro powder. The use of UHMW-PE significantly reduces wear. The UHMW-PE generally has a mean particle diameter $D_{50}$ (volume based and determined by light scattering) in the range of 1 to 5000 μm, preferably from 10 to 500 μm and particularly preferably from 10 to 150 μm such as 30 to 130 μm or 80 to 150 μm or 30 to 90 μm.

The UHMW-PE has an average molecular weight of higher than $1.0 \cdot 10^6$ g/mol, preferably higher than $2.0 \cdot 10^6$ g/mol, more preferably higher than $4.0 \cdot 10^6$ g/mol, determined by viscosimetry.

Preferably, the viscosity number of the UHMW-PE is higher than 1000 ml/g, more preferably higher than 1500 ml/g, especially ranging from 1800 ml/g to 5000 ml/g, such as ranging from 2000 ml/g to 4300 ml/g (determined according to ISO 1628, part 3; concentration in decahydronaphthalin: 0.0002 g/ml).

Suitable UHMW-PE is commercially available from Ticona GmbH, Germany under the tradename GUR®, such as GUR®4120 and GUR®4150.

A specially preferred molding composition of the invention comprises
a) 40 to 90 wt.-%, preferably 55 to 85 wt.-% of one or more polyoxymethylene(s)(A),
b) 0.2 to 3.0 wt.-%, preferably 0.3 to 1.5 wt.-% of one or more coupling agent(s) (B), preferably an aromatic polyisocyanate,
c) 5 to 45 wt.-%, preferably 10 to 40 wt.-% of one or more reinforcing fiber(s) (C), preferably glass fiber(s) and
d) 0.05 to 0.5 wt.-%, preferably 0.08 to 0.3 wt.-% of one or more formaldehyde scavenger (D), preferably an aromatic formaldehyde scavenger, more preferably a formaldehyde scavenger having a melting point higher than 235° C., most preferably a formaldehyde scavenger having a melting point which is at least 10° C. higher than the melting point of the polyoxymethylene (A), and especially preferable melamine or a melamine derivative; wherein the weight is based on the total weight of the composition.

The reaction of the components is typically effected at temperatures from 100 to 260° C., such as from 150 to 220° C., and the duration of mixing is typically from 0.2 to 60 minutes.

A further embodiment of the present invention is a process for the manufacturing of a molding composition of the present invention comprising the following steps:
a) melt mixing a composition comprising
at least one polyoxymethylene (A),
at least one coupling agent (B),
at least one reinforcing fiber (C),
at least one formaldehyde scavenger (D) and
0.1 to 3 wt.-% of stabilizer and processing auxiliaries;
at a temperature ranging from 120° C. to 260° C., preferably from 120° C. to 200° C.,
wherein the melting point of the formaldehyde scavenger (D) is at least 10° C. higher than the melt mixing temperature.

The preferred ranges referred to above in conjunction with the composition of the invention apply also to the process of the invention.

A further embodiment of the invention is a molding composition which is obtainable by the process of the invention.

In one embodiment, the molding composition of the present disclosure is reacted together and compounded prior to being used in a molding process. For instance, in one embodiment, the different components can be melted and mixed together in a conventional single or twin screw extruder at a temperature described above. Extruded strands may be produced by the extruder which are then pelletized. Prior to compounding, the polymer components may be dried to a moisture content of about 0.05 weight percent or less. If desired, the pelletized compound can be ground to any suitable particle size, such as in the range of from about 100 microns to about 500 microns.

A further embodiment of the present invention is a molded part obtainable by molding a molding composition of the present invention.

Preferred molded parts are parts used in the automotive industry, especially housings, latches, window winding systems, pulleys, wiper systems, sun roof systems, seat adjustment, levers, gears, claws, pivot housings, brackets or wiper arms.

The molded parts can be obtained by the molding techniques known in the art such as extrusion, injection molding thermoforming, blow molding, rotational molding and the like.

The molding composition of the present invention is especially suitable to be used in the manufacturing of molded parts used in the automotive industry. Thus, a further embodiment of the present invention is the use of the composition according to the present invention for the manufacturing of molded parts used in the automotive industry.

Due to the excellent mechanical properties and the low formaldehyde emission the molding composition of the invention can be used for several applications where stiffness, tensile strength and high impact resistance are desired.

A further embodiment is the use of the composition or molded parts of the present invention for housings, latches, window winding systems, wiper systems, sun roof systems, seat adjustment, levers, gears, claws, pivot housings or wiper arms.

EXAMPLES

The following components were used in the Examples:
POM 0: MVR 8 cm³/10 min; Polyoxymethylene with a content of 3.4 wt.-% dioxolane comonomer; portion of terminal OH groups: 6-8 mmol/kg; melting point: 165° C.
POM 1: MVR 8 cm³/10 min; Polyoxymethylene with a content of 3.4 wt.-% dioxolane comonomer; portion of terminal OH groups: 20-25 mmol/kg; melting point: 165° C.
B: Methylenediphenyl-4,4'-diisocyanate (MDI)
C: reinforcing fiber (NEG ECS 03 T-651H); sized glass fiber
E: additives All components beside the glass fiber were mixed together. For the compounding a ZSK 25MC, (Werner&Pfleiderer, Germany) was used (zone temperature 190° C., melt temperature about 210° C.). The glass fiber was added using a downstream feeding unit at a suitable position. The screw configuration with kneading elements was chosen so that effective thorough mixing of the components took place during the reactive extrusion as well as an optimal glass fiber length was obtained.

Unless indicated otherwise all determinations have been carried out at room temperature (23° C.).

The testing of the prepared molding compositions was performed according to the following standards:
MVR (190° C.; 2.16 kg): ISO 1133;
Charpy notched impact strength: determined at 23° C. according to ISO 179-1/1eA(CNI);
Elongation at break, E-modulus and stress at break have been determined according to ISO 527;
Formaldehyde emission has been determined according to VDA 275 (Verband der Automobilindustrie e.V. (VDA), July 1994);
Portion of terminal OH groups in POM has been determined as described in K. Kawaguchi, E. Masuda, Y. Tajima, Journal of Applied Polymer Science, Vol. 107, 667-673 (2008).

Melting point of polyoxymethylene (POM) has been determined with Differential Scanning calorimetry (DSC); heating rate 10 K/min according to ISO 11357-1, -2, -3.

The results are listed in the following tables.

TABLE 1

| Examples | A Type | A % by weight | B % by weight | C % by weight | D (melamine) % by weight | E (additives) % by weight |
|---|---|---|---|---|---|---|
| 1 | POM 1 | 71.99 | 0.7 | 26 | 0.11 | 1.2 |
| 2 (comparative) | POM 1 | 72.69 | 0 | 26 | 0.11 | 1.2 |
| 3 | POM 0 | 71.99 | 0.7 | 26 | 0.11 | 1.2 |
| 4 (comparative) | POM 0 | 72.69 | 0 | 26 | 0.11 | 1.2 |

Table 2 shows the mechanical properties as well as the formaldehyde emissions of Examples 1 to 4

TABLE 2

|  | Example 1 | Example 2 | Example 3 | Example 4 |
|---|---|---|---|---|
| VDA 275 (7 d/1.5 mm) [ppm] | 6.9 | 5.8 | 6.9 | 5.9 |
| Stress at break [MPa] | 161 | 143 | 160 | 145 |
| Elongation at break [%] | 3.7 | 2.7 | 3.1 | 2.6 |
| Notched Charpy [kJ/m$^2$] | 12.9 | 8.8 | 11.5 | 9 |

Figure 2:
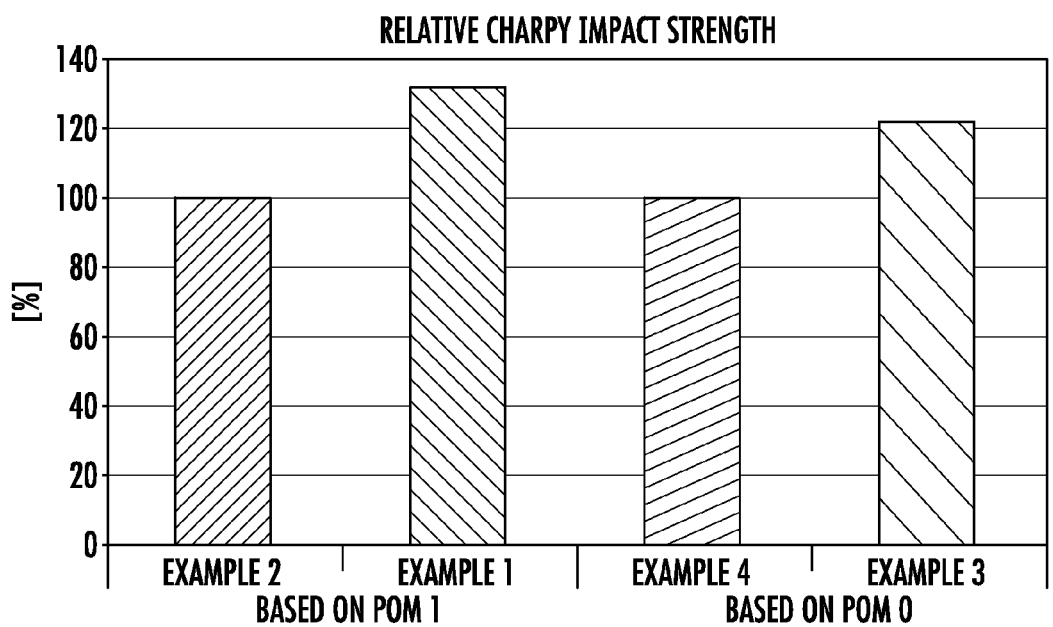
FIG. 2 is a bar graph showing the relative charpy impact strength for the examples described below.

The relative improvement for POM 0 and POM 1 with (according to the invention) and without (comparative) coupling agent with respect to elongation at break and impact resistance are shown in FIG. 1 and FIG. 2.

TABLE 3

Different formaldehyde scavengers (D)

| Examples | A Type | A % by weight | B wt.-% | C % by weight | D Type | D % by weight | E wt.-% |
|---|---|---|---|---|---|---|---|
| 5 | POM 1 | 72.19 | 0.5 | 26 | melamine | 0.11 | 1.2 |
| 6 | POM 1 | 71.79 | 0.5 | 26 | benzoguanamine/melamine | 0.4/0.11 | 1.2 |
| 7 | POM 1 | 71.39 | 0.5 | 26 | benzoguanamine/melamine | 0.8/0.11 | 1.2 |

The mechanical properties as well as the formaldehyde emissions of the compositions according to the examples 5 to 7 are shown in Table 4.

TABLE 4

|  | Example 5 | Example 6 | Example 7 |
|---|---|---|---|
| VDA 275 (7 d/1.5 mm) [ppm] | 6.5 | 3.0 | 1.7 |
| Stress at break [MPa] | 153.7 | 144.6 | 137.9 |
| Elongation at break [%] | 3.5 | 3.0 | 2.7 |
| Notched Charpy [kJ/m$^2$] | 12.9 | 10.4 | 7.5 |

TABLE 5

Different amounts of glass fibers (C)

| Examples | A Type | A % by weight | B % by weight | C % by weight | D Type | D % by weight | E % by weight |
|---|---|---|---|---|---|---|---|
| 11 | POM 1 | 82.99 | 0.7 | 15 | melamine | 0.11 | 1.2 |
| 1 | POM 1 | 71.99 | 0.7 | 26 | melamine | 0.11 | 1.2 |
| 12 | POM 1 | 55.99 | 0.7 | 42 | melamine | 0.11 | 1.2 |

The mechanical properties and the formaldehyde emission properties of examples 11, 12 and 1 are shown in Table 6.

TABLE 6

|  | Example 11 | Example 1 | Example 12 |
|---|---|---|---|
| Tensile Modulus [MPa] | 6340 | 9610 | 14730 |
| Stress at break [MPa] | 120.9 | 161 | 170.4 |
| Elongation at break [%] | 4.0 | 3.7 | 2.4 |
| Notched Charpy [kJ/m$^2$] | 9.9 | 12.9 | 13.7 |

TABLE 7

Different formaldehyde scavenger (D)

| Examples | A Type | A % by weight | B wt.-% | C % by weight | D Type | D % by weight | E wt.-% |
|---|---|---|---|---|---|---|---|
| 13 | POM 1 | 72.1 | 0.7 | 26 | — | | 1.2 |
| 14 | POM 1 | 71.99 | 0.7 | 26 | benzoguanamine | 0.11 | 1.2 |
| 1 | POM 1 | 71.99 | 0.7 | 26 | melamine | 0.11 | 1.2 |
| 15 | POM 1 | 71.99 | 0.7 | 26 | SDH[1)] | 0.11 | 1.2 |
| 16 | POM 1 | 71.99 | 0.7 | 26 | DCD[2)] | 0.11 | 1.2 |

[1)]sebacic dihydrazide
[2)]dicyandiamide

TABLE 8

|  | Example 13 | Example 14 | Example 1 | Example 15 | Example 16 |
|---|---|---|---|---|---|
| Tensile Modulus [MPa] | 10150 | 10210 | 9610 | 9830 | 9990 |
| Stress at break [MPa] | 158.9 | 158.5 | 161 | 160.2 | 162.4 |
| Elongation at break [%] | 3.5 | 3.5 | 3.7 | 3.5 | 3.4 |
| Notched Charpy [kJ/m$^2$] | 13.7 | 13.9 | 12.9 | 13.1 | 13.4 |
| VDA 275 (7 d/1.5 mm) [ppm] | 19.6 | 14.8 | 6.9 | 7.6 | 11.2 |

The invention claimed is:

1. A molding composition comprising:
   a) at least one polyoxymethylene (A), wherein at least 25% of the terminal groups are hydroxyl groups,
   b) at least one coupling agent (B), which is a polyisocyanate compound selected from the group consisting of an aliphatic polyisocyanate, a cycloaliphatic polyisocyanate, an aromatic polyisocyanate, and mixtures thereof,
   c) at least one reinforcing fiber (C),
   d) at least one formaldehyde scavenger (D) and
   e) 0.1 to 3 wt.-% of stabilizer and processing auxiliaries, wherein the weight is based on the total weight of the composition,
   wherein the polyisocyanate compound provides a direct linkage between the at least one polyoxymethylene and the at least one reinforcing fiber or a sizing material coated on the at least one reinforcing fiber.

2. A molding composition according to claim 1, wherein the polyoxymethylene (A) comprises at least 50 mol-% of —CH$_2$O— repeat units.

3. A molding composition according to claim 1, wherein polyoxymethylene (A) is present in an amount up to 95 wt.-%, wherein the weight is based on the total weight of the molding composition.

4. A molding composition according to claim 1, wherein the composition additionally comprises an ultrahigh molecular weight polyethylene.

5. A molding composition according to claim 1, wherein the coupling agent (B) is present in an amount ranging from 0.1 to 5 wt.-%, wherein the weight is based on the total weight of the composition.

6. A molding composition according to claim 1, wherein the formaldehyde scavenger (D) is an aromatic compound.

7. A molding composition according to claim 1, wherein the formaldehyde scavenger (D) has a melting point higher than 235° C.

8. A molding composition according to claim 1, wherein the formaldehyde scavenger (D) has a pKa value ranging from 4.5 to 10.

9. A molding composition according to claim 1, wherein the formaldehyde scavenger (D) has a melting point which is at least 10° C. higher than the melting point of the polyoxymethylene (A).

10. A molding composition according to claim 1, wherein the formaldehyde scavenger (D) is melamine.

11. A molding composition according to claim 1, wherein the formaldehyde scavenger (D) is present in the composition in an amount up to 2 wt.-%, wherein the weight is based on the total weight of the composition.

12. A molded part produced by molding a molding composition synthesized according to claim 1.

13. A method for manufacturing a molding composition, the method comprising:
   a) melt mixing a composition comprising
      at least one polyoxymethylene (A), wherein at least 25% of the terminal groups are hydroxyl groups,
      at least one coupling agent (B), which is a polyisocyanate compound selected from the group consisting of an aliphatic polyisocyanate, a cycloaliphatic polyisocyanate, an aromatic polyisocyanate, and mixtures thereof,
      at least one reinforcing fiber (C),
      at least one formaldehyde scavenger (D) and
      0.1 to 3 wt.-% of stabilizer and processing auxiliaries,
      wherein the polyisocyanate compound provides a direct linkage between the at least one polyoxymethylene and the at least one reinforcing fiber or a sizing material coated on the at least one reinforcing fiber;
   at a temperature ranging from 120° C. to 260° C.,
   wherein the melting point of the formaldehyde scavenger is at least 10° C. higher than the melt mixing temperature.

14. A molding composition according to claim 1, wherein the stabilizer and processing auxiliaries comprise a UV stabilizer.

15. A molding composition according to claim 1, wherein the stabilizer and processing auxiliaries comprise a heat stabilizer.

* * * * *